United States Patent Office 2,900,597
Patented Aug. 18, 1959

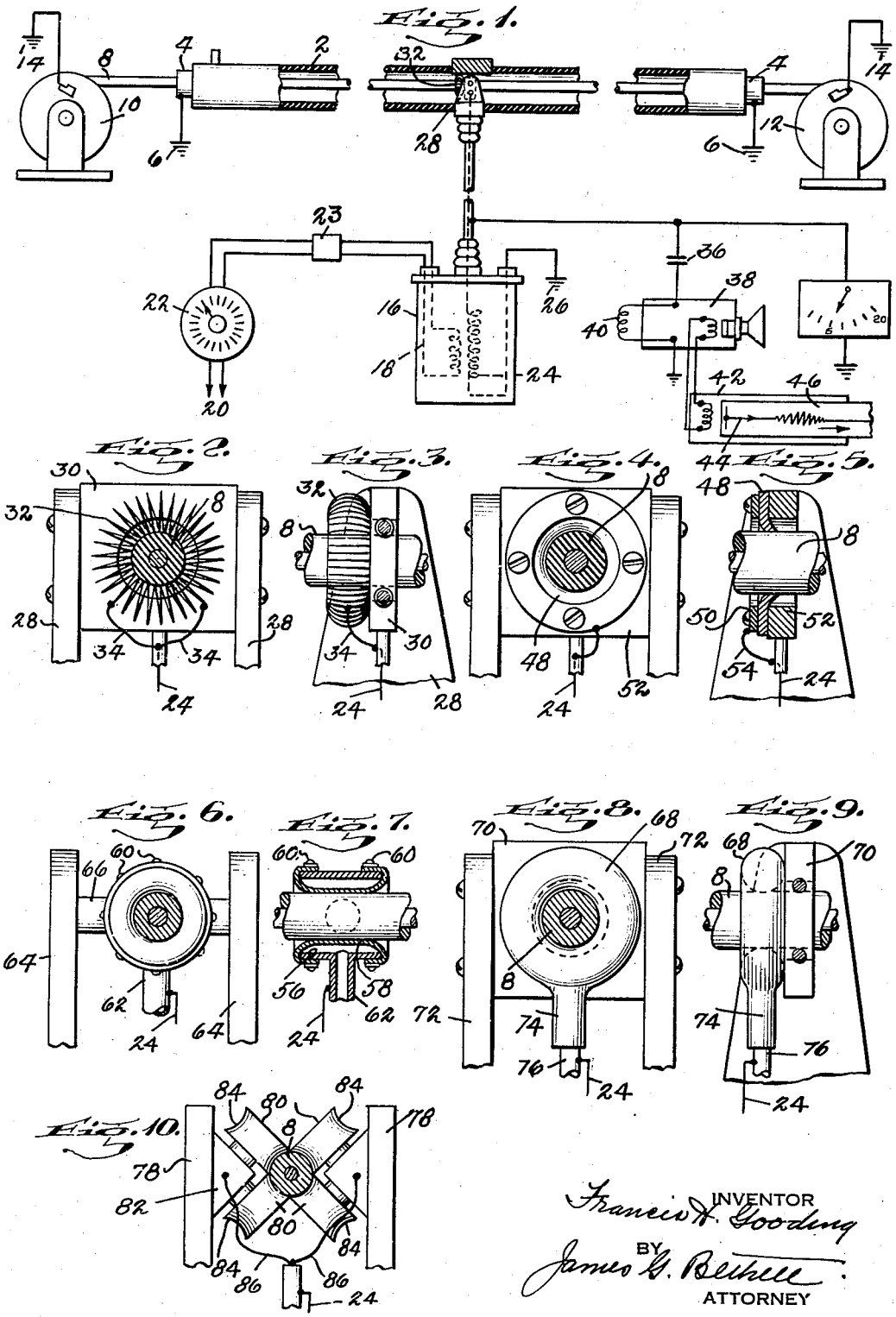

2,900,597

APPARATUS FOR TESTING ELECTRIC CABLE INSULATION

Francis H. Gooding, Lodi, N.J., assignor to The Okonite Company, Passaic, N.J., a corporation of New Jersey Application December 6, 1956, Serial No. 626,766

16 Claims. (Cl. 324—54)

This invention is directed to new and improved apparatus for testing the insulation of continuous lengths of insulated wire and cable for voids and other imperfections.

In general, the present invention provides an apparatus for establishing a dielectric stress in the insulation being tested which is at least as high as the stress to which the insulation would be subjected were the wire or cable operating at its rated voltage. The wire or cable being tested is advanced continuously relative to the source of stress, and suitable equipment is provided whereby any variation in the dielectric stress caused by the sudden ionization or local breakdown of an imperfection in the insulation being tested is indicated.

Testing apparatus of this broad, general nature is disclosed in my co-pending application Serial No. 376,639, filed August 26, 1953, now Patent No. 2,794,168. The present invention provides a new and improved apparatus for practicing the method broadly disclosed in my prior application above referred to.

One of the objects of the present invention is to provide testing apparatus of the type above referred to in which the wire or cable is progressively submerged in a gas having high dielectric strength, such as sulphur hexafluoride or air under positive pressure.

Another object of the invention is to provide an annular electrode through which the wire or cable is passed, this electrode being of such construction that the entire surface or periphery of the insulation under test will be contacted. The use of a gas rather than a semi-conducting liquid, such as employed in my prior application above referred to, has certain advantages which will be appreciated by those skilled in the art to which this invention relates, and the employment of an electrode of such construction that the entire periphery of the insulation is contacted obviously eliminates all danger of failure to test some part of the insulation.

In the accompanying drawings I have illustrated several embodiments of my invention.

Fig. 1 is a part-sectional, elevational view of my improved apparatus;

Figs. 2 and 3 are front and side-elevational views, respectively, of one form of an annular electrode usable in practicing my invention;

Fig. 4 is a front elevation of another form of electrode;

Fig. 5 is a cross-section of the electrode of Fig. 4;

Fig. 6 is a front elevation of still another form of annular electrode;

Fig. 7 is a cross-section of the electrode of Fig. 6;

Figs. 8 and 9 show in front and side elevation, respectively, another form of electrode; and Fig. 10 shows in front elevation still another form of electrode.

Referring to the drawings in detail and, first of all, to the embodiment of my invention as illustrated in Figs. 1, 2, and 3 of the drawings:

2 designates a tube of semi-conducting material, such as a suitable plastic in which conducting particles—carbon, for instance—have been dispersed. This tube is equipped at each end with a stuffing box 4 of metal or other suitable conducting material. These stuffing boxes are grounded, as indicated at 6. 8 designates a wire or cable the insulation of which is to be tested. As illustrated, the wire or cable is taken from the let-off reel 10 and rewound upon the take-up reel 12. The conductor of the wire or cable 8 is grounded at the two reels, as shown at 14.

The source of dielectric stress to which the insulation of the wire or cable 8 is to be subjected is a transformer 16, the primary winding 18 of which receives its energy from a 60-cycle power source 20. A voltage regulator 22 and a circuit breaker 23 are provided in the line to the transformer primary. The secondary of the transformer is designated 24. One side of this secondary is grounded, as shown at 26.

Extending into the semi-conducting tube 2 is a pair of brackets 28, carrying a plate 30, which extends transversely of the tube.

The cable 8, during testing, progresses from left to right, as viewed in Fig. 1, and in front of the plate 30 is an electrode 32. This electrode, in this embodiment of my invention, takes the form of a metallic, helical spring formed into a continuous torus.

As above pointed out, one side of the transformer secondary 24 is grounded. The other side of this secondary is connected to the electrode 32 by leads 34. The side of the transformer secondary which is connected to the electrode 32 is connected through a high-voltage, corona-free condenser 36 to a radio receiver 38. The charging current of the condenser 36 is by-passed around the receiver 38 by connecting a small inductor 40 across the receiver terminals. The inductance of 40 is sufficient to present a high impedance to the high-frequency corona currents but only a low impedance to the 60-cycle power current passing through the high-voltage condenser 36, so that the receiver will respond only to the high-frequency corona voltage which is generated in the cable under test when corona is initiated in a void.

Connected to the output of the receiver 38 is a recording galvanometer 42, the recording stylus of which is designated 44. 46 designates the paper tape which cooperates with the galvanometer stylus in conventional fashion, the tape traveling in the direction of the arrow thereon.

While I have shown an aural indicating device as well as a visual one, it is to be understood that either one may be used alone, if desired. It also is to be understood that indicating devices other than those I have specifically mentioned may be employed within the comprehension of my invention.

In setting up this apparatus, the wire or cable 8 is drawn from let-off reel 10, passed through adjacent stuffing box 4, semi-conducting tube 2, electrode 32, and out of the tube through the other stuffing box 4 to take-up reel 12. As already pointed out, the tube 2 is filled with a high dielectric-strength gas, such as compressed air or sulphur hexafluoride, for example. The regulator 22 of the transformer 16 is then set so that the voltage at the surface of the insulation at the electrode 32 is not less than and preferably slightly higher than the normal rated operating voltage of the wire or cable. For example, if the rated operating voltage is 12,000 volts, I prefer to set the regulator 22 for a voltage at the electrode 32 of 18,000 volts. It will be apparent that, if the wire or cable 8 is advanced continuously through the semi-conducting tube 2, its insulation will be subjected progressively to a dielectric stress, which increases until the electrode 32 is reached, the stress progressively decreasing thereafter until the discharge end of the tube 2 is reached. The indicating devices 38 and 42 will, of course, indicate aurally and visually any variation in the dielectric stress caused by the sudden ionization or local breakdown of an imperfection in the insulation which eventually might cause failure of the wire or cable at its rated operating voltage. In other words, the indicating devices will indicate continuously the ionization characteristics of the insulation being tested.

The use of air under pressure or of a high dielectric-strength gas, such as sulphur hexafluoride, which may or may not be under positive pressure, has certain advantages in commercial operation over a liquid of high dielectric strength—such as oil or molten wax, for example—in that, not only is the cable dry-tested, but there is no danger of injury to the insulation by reason of the contact of this gaseous material with the insulation.

The electrode 32 is of advantage as compared with other types of electrode—such as a rigid tube, for example—in that, by reason of its construction, not only will the entire periphery of the insulation be firmly contacted as the wire or cable 8 passes through the electrode, but wire or cable differing in outside diameter over quite a wide range may be tested with the one electrode, rather than having to substitute a new electrode every time it is desired to test a wire or cable of a different outside diameter. I should like to emphasize too that it is very desirable that the electrode 32 shall grip the insulation firmly and accommodate itself to any irregularities present on the insulation surface. I am assured of this type of contact with the electrode 32.

In Figs. 4 and 5 of the accompanying drawings I have shown an annular electrode which may be substituted for the electrode 32 above referred to. The electrode of Figs. 4 and 5 comprises a non-rigid, conducting diaphragm 48, clamped between metal plate 50 and backing plate 52. The plate 50 is connected by suitable connection 54 to the secondary 24 of the transformer, as described in connection with Fig. 1. The diaphragm 48 is of non-metallic, non-rigid, elastic, conducting material, such as a conducting elastomer.

It will be appreciated that the electrode of Figs. 4 and 5, by reason of its construction, will engage the entire surface of the insulation of a wire or cable 8 being tested and, likewise, will accommodate insulating walls of various outside diameters and walls which may not be truly circular in cross-section.

The annular electrode illustrated in Figs. 6 and 7 may be substituted in Fig. 1 for either of the electrodes already described. The electrode of this embodiment comprises a metal sleeve 56, lined with a non-metallic tube 58. This lining tube is composed of a conducting elastomer or other suitable conducting, non-metallic, non-rigid, elastic material. The ends of this conducting lining tube 58 are bent over the ends of the metallic sleeve 56 and riveted or otherwise secured to the sleeve, as indicated at 60. If found necessary, cement may be used between the ends of 56 and the bent-over ends of 58 to provide a hermetic seal. The lining tube 58 is appreciably smaller in diameter than the inside diameter of the sleeve 56, as will be seen from Fig. 7. The sleeve 56 is provided with a hollow metal stem 62, through which air under pressure may be introduced between the sleeve and its non-metallic, conducting lining tube 58. This stem also provides for connecting the secondary 24 of the transformer to the sleeve. The electrode may be carried by two brackets 64, connected by a cross-plate 66 for mounting in the conducting tube 2 of Fig. 1. This electrode will contact the entire surface of the insulation being tested with any pressure desired, which will be controlled, of course, by the pressure of the air introduced between the sleeve 56 and its lining 58. It will be appreciated also that this electrode will accommodate cables of various outside diameters and will accommodate itself to insulating walls which may not be smooth on their face and which may not be truly circular in cross-section.

The electrode of Figs. 8 and 9 is similar to the electrode of Fig. 2, except that I here employ an inflatable conducting torus 68 instead of the wire torus 32 of Fig. 2. 70 is a backing plate for the torus 68, this plate being carried by brackets 72. The torus 68 may be provided with a stem 74, receiving a metal tube 76, sealed into the stem. This tube 76 provides for connecting the torus to the transformer secondary 24 and also for supplying air under pressure to the torus to inflate the same to contact the insulating wall being tested with whatever contact pressure may be desired. Here again, this electrode is usable with cables of various outside diameters and which may not be truly circular in cross-section. The material employed for the conducting torus 68 may be the same as that referred to as being usable in the forms of electrode illustrated in Figs. 4 and 6.

The electrode of Fig. 10 differs from that of Figs. 4 and 6 in that it is composed of metal. Referring to this electrode, 78 designates a pair of brackets, supporting four metal contact rollers 80. These rollers are mounted in metal blocks 82, fastened to or integral with the brackets 78. From the drawing it will be apparent that the rollers are set so that the axes of rotation of opposed rollers are parallel, while the axes of rotation of adjacent rollers are at right angles to each other. It will be observed also that the peripheries of the rollers are concaved, as indicated at 84, and that the radius of each concavity is the same as that of the periphery of the insulating wall of the cable 8 to be tested. It should be noted also that the width of the face of each contact roller is such that, when set up, the concaved faces of the rollers will abut, so that the total periphery of the insulating wall of the wire or cable 8 will be contacted as the wire or cable passes between the rollers. The mounts 82 for the rollers 80 may be connected by leads 86 to the transformer secondary 24.

If desired, the tube 2 may be an insulating tube instead of a semi-conducting one, in which event the gaseous material within the tube should be under positive pressure for best results, although good results are obtainable if the sulphur hexafluoride is only under atmospheric pressure. It will be understood by those skilled in this art that, when the tube 2 is insulating rather than semi-conducting, the establishment of dielectric stress in the insulation is confined to that area of the insulation which at the moment is passing through the high-voltage electrode.

It will be seen from all of the foregoing that I have disclosed apparatus adapted for the ionization-testing of the insulation of electric wires and cables wherein I employ an electrode which may take various forms and is of such construction that the total periphery of the insulation being tested will be tested, and that, with the exception of the form disclosed in Fig. 10, the one electrode may be employed for testing the insulation of wires and cables varying in outside diameter over a considerable range.

It will be appreciated also that breakdown of the air surrounding the insulation when voltage is applied is prevented.

It is to be understood that changes may be made in the details of construction above described and illustrated in the drawings within the purview of my invention.

What I claim is:

1. Apparatus for the ionization-testing of electric wire and cable insulation, said apparatus comprising, in combination, a pipe of semi-conducting material; a grounded stuffing-box at each end of said pipe; a high dielectric-strength gas within said pipe; means for continuously advancing an insulated wire or cable, having its conductor grounded, through said pipe, an annular electrode so positioned within the pipe that the wire or cable will pass through the said annulus, and the total periphery of the insulation of the wire or cable will be contacted thereby; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

2. Apparatus for the ionization-testing of electric wire and cable insulation, said apparatus comprising, in combination, a pipe of semi-conducting material containing sulphur hexafluoride; a grounded stuffing box at each end of said pipe; means for continuously advancing an insulated wire or cable, having its conductor grounded, through said pipe; an annular electrode so positioned within the pipe that the wire or cable will pass through the electrode, and the total periphery of the insulation of the wire or cable will be contacted thereby; a high voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

3. Apparatus for the ionization-testing of electric wire and cable insulation, said apparatus comprising, in combination, a pipe of semi-conducting material containing a high dielectric-strength gas; a grounded stuffing box at each end of said pipe; means for continuously advancing an insulated wire or cable, having its conductor grounded, through said pipe; an annular electrode so positioned within the pipe that the wire or cable will pass through the electrode, and the total periphery of the insulation of the wire or cable will be contacted thereby; a transformer having one side of its secondary connected to said electrode and the other side of its secondary grounded; and an electrically operated indicating device connected to ground and to that side of the transformer secondary which is connected to said electrode, whereby, as a wire or cable being tested progresses through said pipe and electrode, the ionization characteristics of the insulation of the wire or cable will be indicated continuously.

4. Apparatus for the ionization-testing of electric wire and cable insulation, said apparatus comprising, in combination, a pipe of semi-conducting material containing a high dielectric-strength gas; a grounded stuffing box at each end of said pipe; means for continuously advancing an insulated wire or cable, having its conductor grounded, through said pipe; a non-rigid, annular electrode within said pipe and so positioned that the wire or cable will pass through the electrode, and the total periphery of the insulation of the wire or cable will be contacted thereby; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

5. Apparatus for the ionization-testing of electric wire and cable insulation, said apparatus comprising, in combination, a pipe of insulating material; a grounded stuffing box at each end of said pipe; a high dielectric-strength gas within said pipe; means for continuously advancing an insulated wire or cable, having its conductor grounded, through said pipe; an annular electrode so positioned within the pipe that the wire or cable will pass through the said annulus, and the total periphery of the insulation of the wire or cable will be contacted thereby; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

6. Apparatus for the ionization-testing of electric wire and cable insulation, said apparatus comprising, in combination, a pipe of insulating material; sulphur hexafluoride gas within said pipe; a grounded stuffing box at each end of said pipe; means for continuously advancing an insulated wire or cable, having its conductor grounded, through said pipe; an annular electrode so positioned within the pipe that the wire or cable will pass through the electrode, and the total periphery of the insulation of the wire or cable will be contacted thereby; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

7. Apparatus for the ionization-testing of electric wire and cable insulation, said apparatus comprising, in combination, a pipe of insulating material; a high dielectric-strength gas within said pipe; a grounded stuffing box at each end of said pipe; means for continuously advancing an insulated wire or cable, having its conductor grounded, through said pipe; an annular electrode so positioned within the pipe that the wire or cable will pass through the electrode, and the total periphery of the insulation of the wire or cable will be contacted thereby; a transformer having one side of its secondary connected to said electrode and the other side of its secondary grounded; and an electrically operated indicating device connected to ground and to that side of the transformer secondary which is connected to said electrode, whereby, as a wire or cable being tested progresses through said pipe and electrode, the ionization characteristics of the insulation of the wire or cable will be indicated continuously.

8. Apparatus for the ionization-testing of electric wire and cable insulation, said apparatus comprising, in combination, a pipe of insulating material; a high dielectric-strength gas within said pipe; a grounded stuffing box at each end of said pipe; means for continuously advancing an insulated wire or cable, having its conductor grounded, through said pipe; a non-rigid, annular electrode within said pipe and so positioned that the wire or cable will pass through the electrode, and the total periphery of the insulation of the wire or cable will be contacted thereby; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

9. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, having its conductor grounded, through said pipe; an annular electrode within said pipe and so positioned that the wire or cable will pass through the electrode, and the total periphery of the insulation of the wire or cable will be contacted thereby, said electrode comprising a metallic, helical spring formed into a continuous torus; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

10. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, having its conductor grounded, through said pipe; an annular electrode within said pipe and so positioned that the wire or cable will pass through the electrode, and the total periphery of the insulation of the wire or cable will be contacted thereby, said electrode comprising a non-rigid, non-metallic, conducting diaphragm; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

11. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, having its conductor grounded, through said pipe; an annular electrode within said pipe and so positioned that the wire or cable will pass through the electrode, and the total periphery of the insulation of the wire or cable will be contacted thereby, said electrode comprising a metal sleeve, a non-metallic, flexible, conducting tube lining said sleeve, said tube being sealed at its ends to the sleeve, and the tube being smaller in outside diameter than the inside diameter of the sleeve to provide a space between the tube and sleeve for the reception of air under pressure; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

12. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, having its conductor grounded, through said pipe; an annular electrode within said pipe and so positioned that the wire or cable will pass through the electrode, and the total periphery of the insulation of the wire or cable will be contacted thereby, said electrode comprising a metal sleeve lined with a tube of conducting elastomer, said tube being of smaller diameter than the inside diameter of the sleeve, to provide a space between the tube and sleeve for the reception of air under pressure, and sealed at its ends to said sleeve; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

13. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, having its conductor grounded, through said pipe; an annular electrode within said pipe and so positioned that the wire or cable will pass through the electrode, and the total periphery of the insulation of the wire or cable will be contacted thereby, said electrode comprising an inflatable, non-metallic, conducting torus; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

14. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, having its conductor grounded, through said pipe; an annular electrode within said pipe and so positioned that the wire or cable will pass through the electrode, and the total periphery of the insulation of the wire or cable will be contacted thereby, said electrode comprising an inflatable torus of conducting elastomer; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionizaion characteristics of the insulation of the wire or cable will be indicated continuously.

15. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, the conductor of which is grounded, through said pipe; an annular electrode within said pipe, said electrode being so positioned within the pipe that the wire or cable will pass through the electrode, and the total periphery of the insulation of the wire or cable will be contacted thereby, said electrode comprising a plurality of conducting rollers disposed about the interior of said pipe and having their peripheries so dimensioned as to contact the total periphery of the wire or cable being tested; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

16. Apparatus for the ionization-testing of electric wire and cable insulation, said apparatus comprising, in combination, a pipe of semi-conducting material; a high dielectric-strength gas within said pipe; a grounded stuffing box at each end of said pipe; means for continuously advancing an insulated wire or cable, the conductor of which is grounded, through said pipe; an annular electrode within said pipe so positioned that the wire or cable will pass through the electrode, and the total periphery of the insulation of the wire or cable will be contacted thereby, said electrode comprising a plurality of metal rollers, disposed about the interior of said pipe and having their peripheries so dimensioned as to contact the total periphery of the wire or cable being tested; a high-voltage source, one side of which is connected to said electrode, and the other side of which is grounded; and an electrically operated indicating device connected to ground and to that side of the high-voltage source which is connected to said electrode, whereby, as a wire or cable being tested progresses through said pipe and electrode, the ionization characteristics of the insulation of the wire or cable will be indicated continuously.

References Cited in the file of this patent
UNITED STATES PATENTS

| | | |
|---|---|---|
| 1,505,531 | Bensett | Aug. 19, 1924 |
| 2,436,832 | Soreny | Mar. 2, 1948 |
| 2,444,433 | Erb | July 6, 1948 |
| 2,460,107 | Slade | Jan. 25, 1949 |
| 2,471,560 | Everson et al. | May 31, 1949 |
| 2,497,804 | Stearns | Feb. 14, 1950 |
| 2,513,794 | Gambrill | July 4, 1950 |
| 2,704,825 | Martin et al. | Mar. 22, 1955 |
| 2,794,168 | Gooding | May 28, 1957 |